April 11, 1944. F. H. REICHEL 2,346,187
METHOD FOR PRODUCING AND TREATING TUBING
Filed Nov. 22, 1939
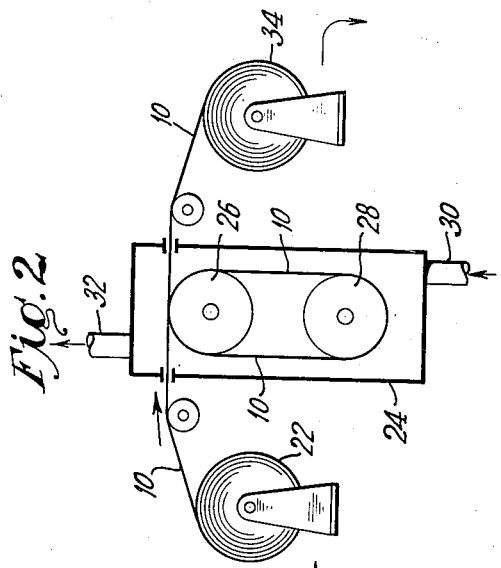
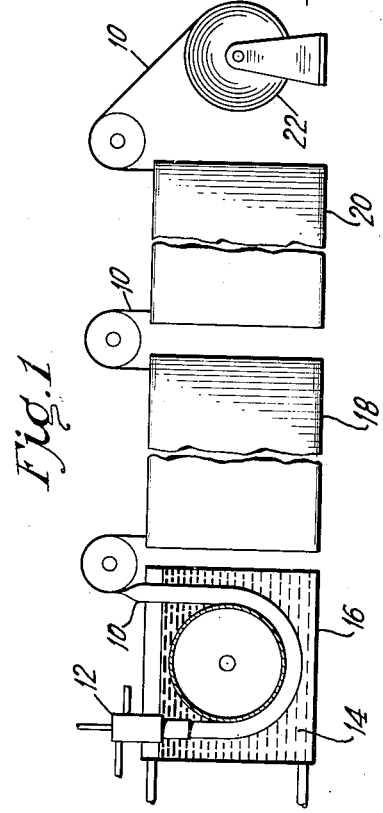
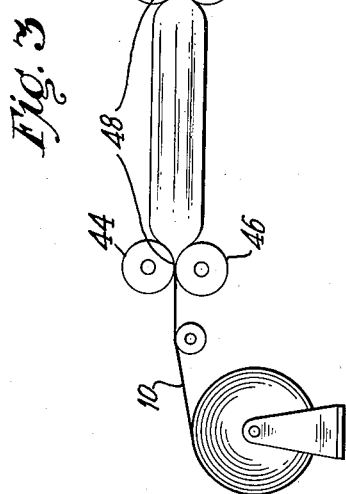
INVENTOR
FRANK H. REICHEL
BY John M. Leach
ATTORNEY Patented Apr. 11, 1944

2,346,187

UNITED STATES PATENT OFFICE 2,346,187

METHOD FOR PRODUCING AND TREATING TUBING

Frank H. Reichel, Fredericksburg, Va., assignor to Sylvania Industrial Corporation, Fredericksburg, Va., a corporation of Virginia Application November 22, 1939, Serial No. 305,618

7 Claims. (Cl. 18—57)

The present invention relates in general to a method of producing and treating tubing and, in particular, to a method and apparatus for drying, softening and sizing tubing made of organic plastic material, for example, tubing of the type used for sausage casings. "Sizing" as used herein designates shaping to predetermined dimensions.

In the production of tubing formed of organic plastic material for use as sausage casings and the like, a customary step in the finishing of the tubing includes drying. If a plastic tubing is dried in a flat condition and free of tension, there is always considerable shrinkage, some wrinkling and the production of two relatively sharp longitudinal creases as the result of being dried in a flattened condition. Such characteristics may be readily obviated by resort to the well known expedient of drying a tubular or hollow member while inflated. This, however, introduces the disadvantages of requiring long drying chambers and, in the case of fresh plastic tubing in particular, the operation must be very carefully controlled to prevent bursting or uneven shaping of the tubing. In respect to the control of stretch while drying in an inflated condition, it has been proposed heretofore to employ a restraining or form-limiting shell for the tube to control the size, but in order to avoid excessively long drying chambers this necessitated drying of the tubes in relatively short sections and allowing them to remain in the chamber the required period as distinguished from a continuous drying operation.

It is a general object of the present invention to obviate the above and other disadvantages and to provide a method of drying and thereafter sizing tubing of organic plastic material in a rapid manner. The method also has marked advantages in respect to accuracy of sizing and economy of manufacture.

Other objects and advantages, if not particularly pointed out, will be apparent from a reading of the following detailed description of what is now considered a preferred form of the invention.

In general, the method of the invention comprises drying a tubing, thereafter preferably softening the tubing for stretching and then subjecting the tubing to an internal pressure to expand it to the desired size.

The invention accordingly comprises the several steps and the relation of one or more of such steps with respect to each of the others, all as exemplified in the following detailed disclosure, and the scope of the invention will be indicated in the claims.

In the drawing, Fig. 1 is a side elevation, partly in section, of one embodiment of an apparatus for extruding organic plastic tubing and for subjecting it to liquid treatments; Fig. 2 is a side elevation, partly in section, of one embodiment of means for drying organic plastic tubing; and Fig. 3 is a diagrammatical representation in side elevation, of one means for softening and stretching organic plastic tubing according to the present invention.

The tubing of the type to which the present invention relates is usually formed continuously in some suitable manner as by extruding a suitable organic plastic material through an annular orifice into a coagulating or setting bath in which the material is hardened in the form of a tubing. Tubing formed from any suitable organic plastic material may be treated in accordance with the present invention, for example, cellulose derivatives, such as cellulose esters, ethers or ether-esters, or cellulose hydrate (Cellophane); casein; vinyl resins; phenol-aldehyde or urea aldehyde condensation products and other synthetic resins, and natural resins.

From the coagulating bath, the tubing is passed to suitable washing, regenerating, purifying and plasticizing baths from which it is wound up on a suitable reel for further treatment, or is passed directly into a suitable drying apparatus. During the drying of the tubing, there is a tendency for it to shrink, both longitudinally and transversely. This causes the tubing to change its cross-sectional size, and unless some means is taken to prevent it, the tubing will vary in cross-sectional size along its length.

It has been proposed heretofore to dry the tubing while it is inflated and expanded to a predetermined cross-sectional size. Since the temperatures to which the tubing can be subjected must be below those which will damage the tubing, it is necessary to subject the tubing to a moderately elevated temperature for a considerable time to bring about the desired amount of drying. This necessitates maintaining the continuously moving tubing in an inflated state over a considerable length of the run of the tubing which requires accurately controlling the fluid pressure within the tubing throughout the entire inflated area to prevent its being stretched beyond the size desired and possibly ruptured, and at the same time stretched to the size desired. Furthermore, the length of time required to size the tubing is not as great as the length of time required to dry the tubing so that the sizing step is unduly prolonged because it is co-extensive with the drying step.

It has now been found that the foregoing disadvantages can be overcome by separating the steps of drying and sizing so that each of these steps is not adversely affected by the peculiar requirements of the other. To this end, it is preferable that the tubing be passed from the drying apparatus to a reel on which it can be stored or immediately conveyed for further treatment.

The dried tubing is passed from the reel through a softening step during which the tubing is softened by the application of a suitable substance and may also be heated at the same time to enhance the plasticity. From the softening step, the tubing is passed through a suitable apparatus wherein it is expanded and sized by means of internal pressure applied by means of a gas, a liquid or a suitable mandrel. From the expanding apparatus, the tubing is reeled and stored for final use or sale.

Referring to the drawing, the tubing 10 is formed by means of an extruding head 12 and passed into a coagulating liquid 14 in a tank 16. The extruding apparatus in and of itself forms no part of the present invention and has been only diagrammatically illustrated. The extruding apparatus illustrated in U. S. Patent No. 2,070,247, issued February 9, 1937, may advantageously be used to form tubing in connection with the present invention. From the tank 16, the tubing is passed through suitable tanks 18 and 20, of which there may be any desired number, to carry out various steps, such as regenerating, purifying, washing and plasticizing, in accordance with well known practices. The number of tanks 18 and 20 will vary in accordance with the type of tubing material used. For example, when the tubing material is cellulose xanthate, it will be necessary to regenerate, desulphurize and plasticize the tubing with suitable washing steps interposed, and when the tubing material is cellulose nitrate, it will be desirable to denitrate, suitably wash and plasticize the tubing. The plasticizing material used is preferably a hygroscopic material which will hold sufficient moisture in the tubing to prevent its becoming hard and brittle. Any suitable well known plasticizer of this type will serve the purpose, for example, glycerine, ethylene glycol, sugar solutions or water soluble oils. From the plasticizing bath, the tubing is wound upon a suitable reel 22, which is removed when filled, and set aside for further treatment or used as a supply reel for the drying apparatus.

The drying apparatus may comprise a chamber 24 containing a pair of suitably driven rollers 26 and 28. The rollers may be hollow and heated by having steam or hot water passed through them or by the use of suitable electrical heaters. The casing 24 may be supplied with heated air by means of a conduit 30 and the heated air may be withdrawn from the casing through a conduit 32. The drying apparatus illustrated in U. S. Patent No. 2,070,252, issued February 9, 1937, may advantageously be used as a drying means in the present invention. The rollers 26 and 28 do not prevent the tubing from shrinking transversely and they may be conically shaped as disclosed in said patent to permit the tubing to also shrink longitudinally. It will be understood that the tubing makes a series of successive circuits over the rollers and thereby is exposed to a long passage through a drier which need occupy but a comparatively small compact space.

The tubing 10 may be passed through the drying chamber 24 in a flattened condition, or it may be slightly distended without stretching, by a suitable fluid while it is being heated, all as described in Patent No. 2,070,252.

From the drying apparatus, the tubing is reeled up on a suitable reel 34 which, when filled, may be set aside for further use or may be immediately used as a supply reel for the softening and stretching apparatus.

From the supply reel 34, the tubing 10 is passed into a casing 36 in which the tubing is treated with a suitable softening material. The softening material is preferably a non-volatile substance such as water, and is preferably sprayed upon the material by suitable spray heads 38 supplied from any suitable source (not shown). In addition to the type of softening material mentioned above, other well known non-solvent softening agents, or well known solvent softening agents preferably diluted with non-solvent diluents to prevent undue softening of the tubing may be used. The softening agents will be selected with regard to the tubing material employed and the amount of softening desired in a particular instance. It will thus be seen that the amount which the tubing is dried in the chamber 24 is not critical, which greatly simplifies the drying operation. It is possible to considerably overdry the tubing since it is rendered substantially uniformly plastic before stretching by the treatment in the softening chamber 36.

After leaving the softening chamber 36, the tubing is passed between a pair of driven pinch rollers 40 and 42 and is then passed through a second pair of pinch rollers 44 and 46. The rollers 40 and 42 serve to close the interior of the tubing by lightly compressing the walls of the flattened tubing together. To this end, the rollers 40 and 42 may be lightly urged together by any suitable mechanism of well known type which forms no part of the present invention. The rollers 44 and 46 are also lightly urged together under sufficient pressure to close the tubing by pressing the walls of the tubing together.

A body of gas, for example, air, carbon dioxide, nitrogen or other suitable gas, is trapped within the interior of the tubing over the relatively short span of the area 48 between the pairs of pinch rollers. A suitable liquid, for example, mercury, glycerine, a glycol, or glycol ether, may be used in place of the gas, or a suitable mandrel having the desired substantially finished size of the tubing may be inserted in the tubing between the pinch rollers in place of the gas. The run of the tubing between the two pairs of pinch rollers may be vertical instead of horizontal, if desired. The gas is placed within the tubing before it is gripped by the pinch rollers 44 and 46 in sufficient quantity to expand the tubing between the two pairs of rollers to any desired extent within the strength limits of the tubing. The expansion of the tubing in this manner stretches the tubing to the desired size, which may be the finished size, or a size sufficiently greater than the finished size to permit the tubing to contract to the finished size in the event the tubing material has any degree of elasticity.

Since the tubing is stretched at substantially the same temperature as when the softening material is applied to it in the softening chamber 36, there is no tendency for the softening material to be driven from the tubing during the stretching operation and the softeners will be preserved, thereby dispensing with any necessity for applying additional softening material to the tubing after the stretching operation. Furthermore, the high rate of speed at which the tubing is passed through the stretching or sizing operation prevents the loss of softening material since there is not sufficient time during the stretching operation for the material to evaporate.

If desired, the tubing may also be heated in the softening chamber 36 as, for example, by passing steam into the chamber by means of a conduit 50 and exhausting the steam from the chamber by means of conduit 52. The heat from the steam further softens the tubing and facilitates the subsequent stretching operation. Other means of applying heat for softening besides steam, or in addition to the steam, may be used, if desired. When the tubing is heated for softening, evaporation of moisture and consequent loss of softening material from the tubing may be prevented by humidifying the air surrounding the tubing while it is being stretched in any suitable manner, as well as by humidifying the body of air placed within the tubing to produce the stretching pressure. The humidification may be accomplished by setting up a vapor pressure of the softening material or materials around the outside as well as on the inside of the tubing. In this manner, loss of the desired softening materials from the tubing due to its elevated temperature is prevented.

In addition to heating the tubing within the chamber 36, the rollers 40 and 42 may be heated in any desired manner, for the purpose of softening the tubing and, if desired, the rollers 44 and 46 may be cooled in any desired manner to lower the temperature of the tubing to room temperature subsequent to stretching.

The pairs of rollers 40 and 42, and 44 and 46 may be driven at different peripheral speeds, if desired, so as to apply a known amount of longitudinal stretch to the tubing, in addition to transverse stretch. Instead of so driving these rollers, other pinch rollers may be provided in the apparatus to stretch the tubing longitudinally. From the pinch rollers 44 and 46, the finished tubing is reeled upon a reel 54 for final disposition.

Tubing can be dried, thereafter stretched and thereby sized in accordance with the present invention at a much more rapid rate than when it is dried and stretched at the same time. This is because the length of the tubing undergoing expansion can be very short, in view of the fact that it is dried prior to being expanded, and does not have to be retained in the expanded state until dried. Since it is not stretched while being dried, it can be passed rapidly through the drying atmosphere of the drying chamber 24 without closely controlling the degree of pressure existing within the tubing at the time and may, if desired, be passed through a drying atmosphere and/or heating rollers while in a flattened or collapsed condition.

Since it is possible to carry out the stretching or sizing step more than twice as fast as the drying step and it is, in turn, possible to carry out the drying step twice as fast as the extruding or other forming operation, it is possible by use of the method of the present invention to utilize one expanding apparatus to accommodate the output from two drying apparatus, each of which, in turn, accommodates the output of two extruding units. In this way, one expanding apparatus and two drying apparatus accommodate the output of four extruders. This reduces to a minimum the amount of machinery required to produce tubing on a large scale basis, while at the same time enables substantially continuous production of tubing since the tubing may be immediately passed on reels from one stage of the method to another, thereby avoiding any delays and dispensing with storage space. Furthermore, the method requires a minimum of operators since the drying apparatus requires very little attendance in view of the fact that a delicate control of the pressure existing within the tubing is not required, and the short span of the stretched area of the tubing requires very little attention during operation of the process.

The method of the present invention may be used advantageously to remove wrinkles or hard creases from tubing while retaining the original size of the tubing or stretching to a different size by passing the creased tubing through the softening and sizing steps of the method.

If desired, the tubing may be passed directly from the extruding unit to the drying apparatus, and directly from the drying apparatus to the conditioning chamber without departing from the scope of the present invention, but it is preferred to perform the method in separate steps for the reasons given.

Since certain changes in carrying out the above method may be made without departing from its scope, it is intended that all matter contained in the above description or shown on the accompanying drawing shall be interpreted as illustrative and not in a limiting sense.

The invention having been described what is claimed is:

1. In a method of producing tubing having a predetermined diameter, the steps comprising forming seamless tubing having a diameter such that upon shrinking, its diameter becomes less than said predetermined diameter of non-fibrous organic plastic material which is incapable of stretching when hard but has the property of shrinking upon drying from the wet state, subjecting said tubing to a liquid treatment, drying the wet tubing to substantially entirely remove the treating liquid therefrom and harden the tubing whereby said tubing shrinks to a diameter less than said predetermined diameter, thereafter subjecting said dried tubing to a softening treatment sufficient only to enable it to be stretched to said diameter, and stretching said stretchable tubing transversely to said predetermined diameter.

2. In a method of producing tubing having a predetermined diameter, the steps comprising forming seamless tubing having a diameter such that upon shrinking, its diameter becomes less than said predetermined diameter of non-fibrous organic plastic material which is incapable of stretching when hard but has the property of shrinking upon drying from the wet state, subjecting said tubing to a liquid treatment, drying the wet tubing to substantially entirely remove the treating liquid therefrom and harden the tubing whereby said tubing shrinks to a diameter less than said predetermined diameter, thereafter subjecting said dried tubing to a softening treatment sufficient only to enable it to be stretched to said diameter, and stretching said stretchable tubing transversely to said predetermined diameter by applying pressure interiorly of the tubing.

3. In a method of producing tubing having a predetermined diameter, the steps comprising forming seamless tubing having a diameter such that upon shrinking, its diameter becomes less than said predetermined diameter of non-fibrous organic plastic material which is incapable of stretching when hard but has the property of shrinking upon drying from the wet state, subjecting said tubing to a liquid treatment, drying the wet tubing to substantially entirely remove the treating liquid therefrom and harden the tubing whereby said tubing shrinks to a diameter less than said predetermined diameter, thereafter subjecting said dried tubing to a softening treatment sufficient only to enable it to be stretched to said diameter and stretching said stretchable tubing transversely to said predetermined diameter by inflating the tubing.

4. In a method of producing tubing having a predetermined diameter, the steps comprising forming seamless tubing having a diameter such that upon shrinking, its diameter becomes less than said predetermined diameter of non-fibrous organic plastic material which is incapable of stretching when hard but has the property of shrinking upon drying from the wet state, subjecting said tubing to a liquid treatment, drying the wet tubing to substantially entirely remove the treating liquid therefrom and harden the tubing whereby said tubing shrinks to a diameter less than said predetermined diameter, thereafter subjecting said dried tubing to a softening treatment sufficiently only to enable it to be stretched to said diameter, and stretching said stretchable tubing longitudinally and transversely to said predetermined diameter.

5. In a method of producing tubing having a predetermined diameter, the steps comprising forming seamless tubing having a diameter such that upon shrinking, its diameter becomes less than said predetermined diameter of non-fibrous water-swelling cellulosic material which is incapable of stretching when hard but has the property of shrinking upon drying from the wet state, subjecting said tubing to a water treatment, drying the wet tubing to substantially entirely remove the water therefrom and harden the tubing whereby said tubing shrinks to a diameter less than said predetermined diameter, thereafter subjecting said dried tubing to a softening treatment with water sufficient only to enable it to be stretched to said diameter and stretching said stretchable tubing transversely to said predetermined diameter.

6. In a method of producing tubing having a predetermined diameter, the steps comprising forming seamless tubing having a diameter such that upon shrinking, its diameter becomes less than said predetermined diameter of non-fibrous water-swelling cellulosic material which is incapable of stretching when hard but has the property of shrinking upon drying from the wet state, subjecting said tubing to a water treatment, drying the wet tubing to substantially entirely remove the water therefrom and harden the tubing whereby said tubing shrinks to a diameter less than said predetermined diameter, thereafter subjecting said dried tubing to the action of such amount of water vapor as to swell the cellulosic material only sufficiently to enable it to be stretched to said diameter, and stretching said stretchable tubing transversely to said predetermined diameter.

7. In a method of producing tubing having a predetermined diameter, the steps comprising forming a seamless tubing having a diameter such that upon shrinking, its diameter becomes less than said predetermined diameter of nitrocellulose which is incapable of stretching when hard but has the property of shrinking upon drying from the wet state, subjecting said tubing to a liquid treatment, drying the wet tubing to substantially entirely remove the treating liquid therefrom and harden the tubing whereby said tubing shrinks to a diameter less than said predetermined diameter, thereafter subjecting said dried tubing to a softening treatment sufficient only to enable it to be stretched to said diameter, and stretching said stretchable tubing transversely to said predetermined diameter.

FRANK H. REICHEL.